United States Patent
Ritzén et al.

(10) Patent No.: US 10,746,402 B2
(45) Date of Patent: Aug. 18, 2020

(54) METHOD AND DEVICE FOR HEATING A FURNACE

(71) Applicant: LINDE AKTIENGESELLSCHAFT, Munich (DE)

(72) Inventors: Ola Ritzén, Åkersberga (SE); David Muren, Vaxholm (SE); Tomas Ekman, Saltsjö-Boo (SE)

(73) Assignee: LINDE AKTIENGESELLSCHAFT, Munich (DE)

( * ) Notice: Subject to any disclaimer, the term of this patent is extended or adjusted under 35 U.S.C. 154(b) by 179 days.

(21) Appl. No.: 15/996,908

(22) Filed: Jun. 4, 2018

(65) Prior Publication Data
US 2018/0347813 A1 Dec. 6, 2018

(30) Foreign Application Priority Data
Jun. 6, 2017 (EP) .................................... 17020240

(51) Int. Cl.
*F23L 7/00* (2006.01)
*F27B 9/36* (2006.01)
(Continued)

(52) U.S. Cl.
CPC ............ *F23L 7/007* (2013.01); *C21C 5/4606* (2013.01); *C21C 5/4673* (2013.01); *F23C 5/32* (2013.01);
(Continued)

(58) Field of Classification Search
CPC ....... C21C 5/4606; C21C 5/4673; F23C 5/32; F23C 7/02; F23L 7/007; F23L 9/04;
(Continued)

(56) References Cited

U.S. PATENT DOCUMENTS 4,606,529 A 8/1986 Tooch
5,458,672 A * 10/1995 Ding ...................... F23C 9/006
75/643

(Continued)

OTHER PUBLICATIONS

European Search Report for EP 17020240.2-1602, dated Dec. 1, 2017, 6 pages.

*Primary Examiner* — Scott R Kastler
*Assistant Examiner* — Michael Aboagye
(74) *Attorney, Agent, or Firm* — Millen White Zelano & Branigan, PC; Brion P. Heaney

(57) ABSTRACT

A method is provided for heating a furnace arranged with a heating zone heated with a burner providing a flame extending in a longitudinal direction and fed with a fuel and a primary oxidant, the burner is operated with a mass relationship between the fed fuel and primary oxidant permitting less than 50% of the fed fuel to be combusted using the primary oxidant, and a respective pair of secondary oxidant lances are provided one either side of the furnace pointing into the heating zone, lancing a secondary oxidant into the heating zone downstream of the burner substantially parallel with a cross plane, such that a temperature is measured downstream of the lances and that each of the lance pairs includes an upstream, low-speed first and a downstream, high-speed second lance, wherein the amount of secondary oxidant supplied via the first lance is regulated to achieve a homogenous lateral temperature profile. A related furnace is also provided.

16 Claims, 4 Drawing Sheets

(51) Int. Cl.
| | |
|---|---|
| *C21C 5/46* | (2006.01) |
| *F23L 9/04* | (2006.01) |
| *F27B 9/20* | (2006.01) |
| *F23C 5/32* | (2006.01) |
| *F23C 7/02* | (2006.01) |
| *F27D 99/00* | (2010.01) |
| *F23N 5/02* | (2006.01) |
| *F27B 9/30* | (2006.01) |
| *F27D 3/16* | (2006.01) |

(52) U.S. Cl.
CPC ............... *F23C 7/02* (2013.01); *F23L 9/04* (2013.01); *F23N 5/02* (2013.01); *F27B 9/20* (2013.01); *F27B 9/30* (2013.01); *F27B 9/36* (2013.01); *F27D 99/0033* (2013.01); *C21C 2250/02* (2013.01); *F23C 2201/00* (2013.01); *F23C 2205/20* (2013.01); *F23C 2900/06041* (2013.01); *F23L 2900/07006* (2013.01); *F23N 2225/14* (2020.01); *F23N 2237/02* (2020.01); *F23N 2237/04* (2020.01); *F23N 2237/16* (2020.01); *F27B 2009/3638* (2013.01); *F27D 2003/169* (2013.01)

(58) Field of Classification Search
CPC ...... F23N 5/02; F27B 9/20; F27B 9/30; F27B 9/36; F27D 99/0033
USPC .......... 266/44, 99, 80, 87, 200; 75/380, 384, 75/484; 432/1, 6, 11, 146, 175
See application file for complete search history.

(56) References Cited

U.S. PATENT DOCUMENTS

| | | | |
|---|---|---|---|
| 6,290,492 B1* | 9/2001 | Li | F27B 9/40 432/133 |
| 6,659,762 B2* | 12/2003 | Borders | F23D 14/22 431/10 |
| 8,333,819 B2* | 12/2012 | Grant | C21C 5/5217 266/44 |
| 2012/0279353 A1 | 11/2012 | Englund et al. | |
| 2013/0255341 A1 | 10/2013 | Ekman et al. | |
| 2015/0168067 A1* | 6/2015 | Eichler | F27B 9/3005 432/11 |

* cited by examiner

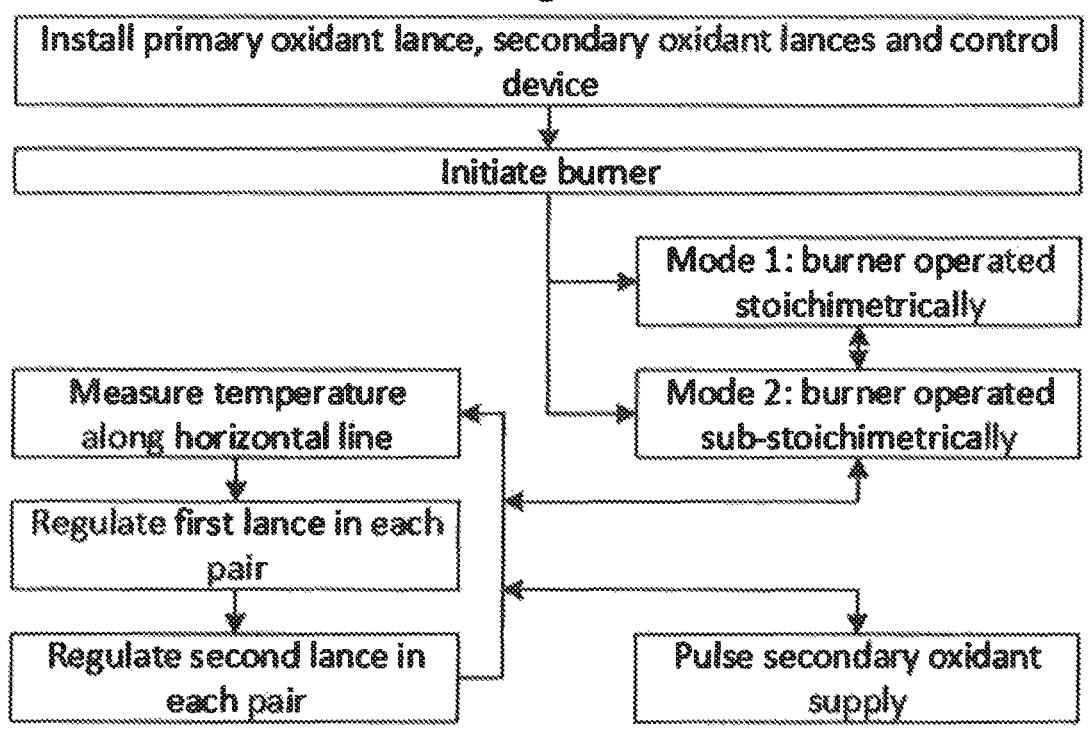

METHOD AND DEVICE FOR HEATING A FURNACE

The present invention relates to a method and a device for heating a furnace. In particular, the invention relates to longitudinally fired continuous furnaces for reheating of metal material, such as different steels.

In many continuously operated reheating furnaces, high-velocity lancing of a primary oxidant is used, for instance in order to increase thermal homogeneity in the furnace. Some such furnaces are longitudinally fired, which herein is intended to mean that at least one combustion burner is arranged so that an associated flame propagates substantially in a longitudinal direction of a heating zone of the furnace in question.

In particular in longitudinally fired lancing applications for low-$NO_x$), flameless combustion, in which high-velocity lancing of an oxidant from a lancing location which is separated from a fuel inlet, the heat resulting from the combustion of such fuel can be carried relatively far downstream towards the inlet of the heating zone in question, resulting in high-temperature off-gases leaving the heating zone. This results in thermal losses.

The present invention solves the above described problems, in particular for furnaces that have been converted to high velocity primary oxidant lancing, in particular for such furnaces in which the primary oxidant is lanced from a location which is separated from a corresponding primary fuel inlet (separated fuel injection), such as with a separation of at least 50 cm.

In particular, the invention solves these problems in case of a furnace with at least one longitudinally firing air burner which has been supplemented with at least one high-velocity, high-oxygen oxidant lance.

Hence, the invention relates to a method for heating a furnace with a longitudinal direction and a cross plane which is perpendicular to the longitudinal direction, which furnace is arranged with at least one heating zone which is heated using at least one burner providing a flame which extends in said longitudinal direction, which burner is fed with a fuel and a primary oxidant, characterised in that the burner is operated with a mass relationship between the fed fuel and primary oxidant permitting less than 90% of the fed fuel to be combusted using the primary oxidant, in that at least two pairs of secondary oxidant lances are provided, one pair on each side of the furnace pointing into the heating zone, lancing a secondary oxidant into the said heating zone downstream of the said burner, substantially in parallel with the cross plane, in that the temperature is measured along a horizontal line parallel to said cross plane downstream of the said lances, in that each of said lance pairs comprises a respective first lance and a respective second lance, which second lance is arranged downstream of the first lance in question, in that the first lance in each lance pair is operated at a lower lancing speed than the second lance in each lance pair, and in that the amount of secondary oxidant supplied via the respective first lance of each pair is regulated so as to achieve a homogenous temperature profile along the said line.

BRIEF DESCRIPTION OF THE DRAWINGS

In the following, the invention will be described in detail, with reference to exemplifying embodiments of the invention and to the enclosed drawings, wherein:

FIG. 4 is a flow chart illustrating a method according to the invention.

FIGS. 1 and 2 share the same reference numerals for same or corresponding parts.

DETAILED DESCRIPTION OF THE INVENTION

Figure 1:
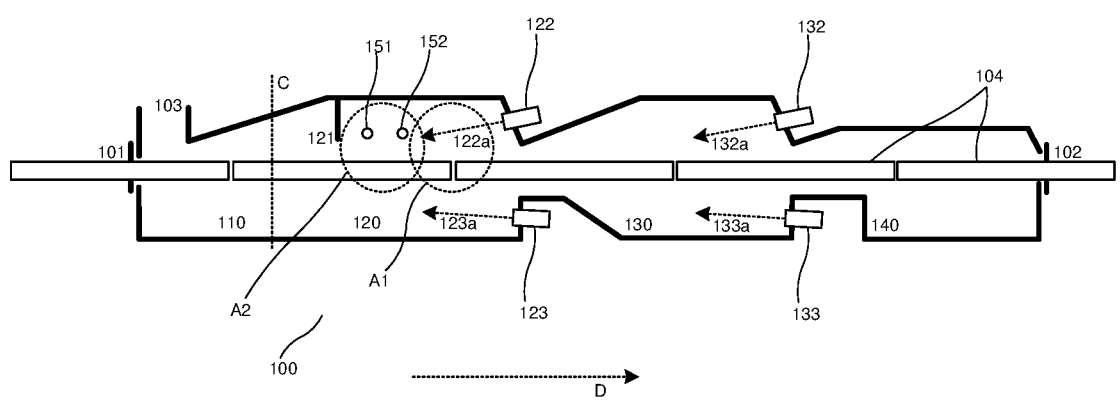
FIG. 1 is a simplified view of a furnace with a heating system according to the present invention, which is arranged to perform a method according to the invention, in a side view.
Figure 2:
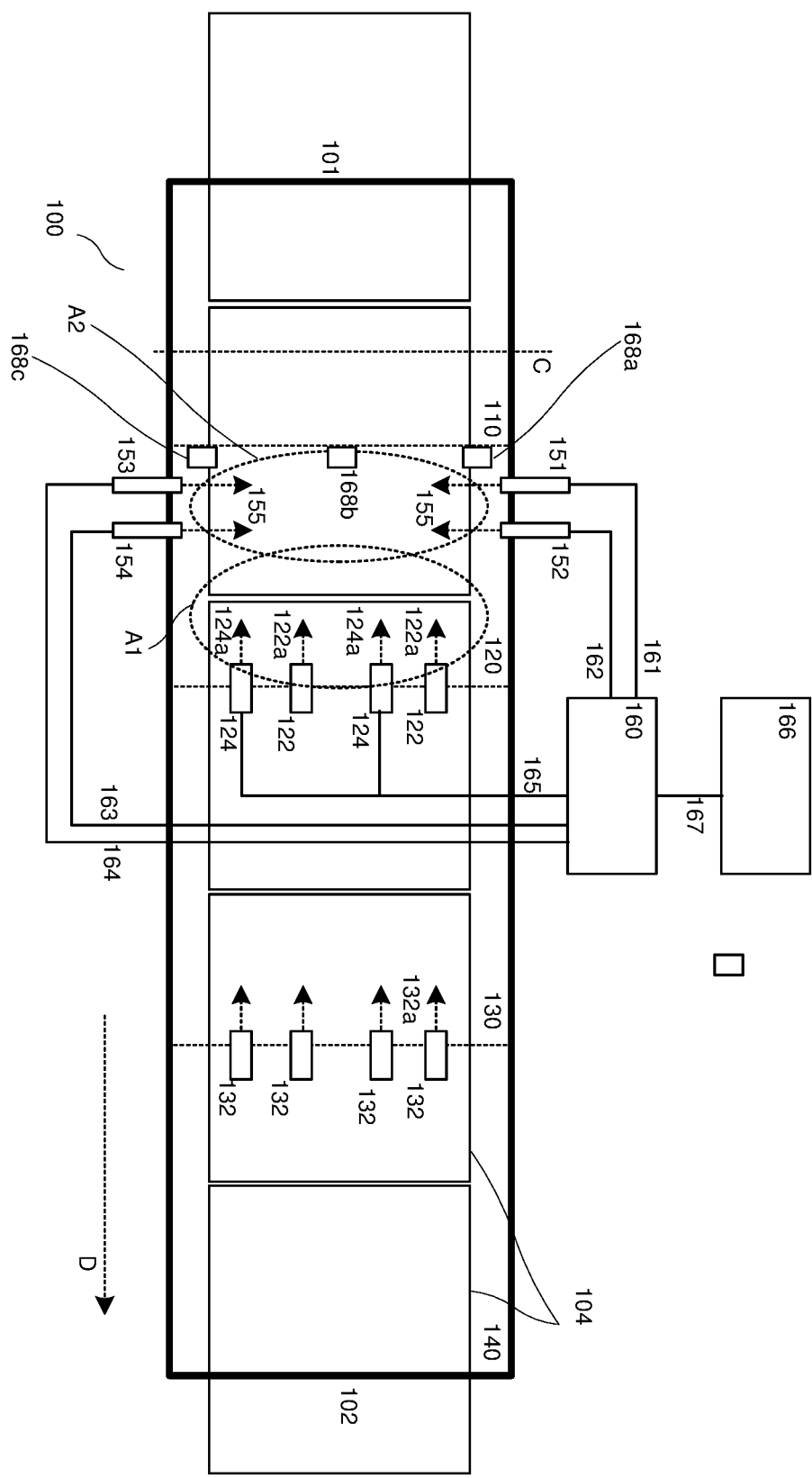
FIG. 2 is a simplified top view of the furnace shown in FIG. 1.

Hence, FIGS. 1 and 2 show an industrial furnace 100 having a longitudinal direction D and a cross plane C which is perpendicular to the longitudinal direction D. The furnace 100 preferably comprises several heating zones 110, 120, 130, 140, through which a metal material 104 is transported, preferably in the longitudinal direction D, whereby the material 104 is heated on its way from an entry door 101 to an exit door 102. Preferably, a dark zone 110 is arranged near the entry door 101, which dark zone 110 is not directly heated using any burners arranged therein.

Preferably, the furnace 100 is a continuous reheating furnace, and the material 104 is preferably a metal material, such as steel. In general, the material 104 is preferably heated to temperatures above about 1,000° C.

The furnace 100 comprises several heating zones 110, 120, 130, 140. According to the invention, the furnace 100 is arranged with at least one heating zone which is heated using at least one burner providing a flame which extends in the longitudinal direction D, and which burner is fed with a fuel and a primary oxidant. In the Figures, zones 120 and 130 represent such zones, which are heated using burners 122, 132, which are longitudinally fired, as explained above, so that their respective flames propagate in respective directions 122a, 132a, substantially in the longitudinal direction D, preferably in a counter-flow manner with respect to the direction of motion of the heated material 104. The zone 120 is hence not a dark zone.

Note that each zone 110, 120, 130, 140 in general comprises both an upper and a lower zone. A baffle 121 is arranged to delimit zone 110 from zone 120.

The fuel may be a gaseous, liquid or solid fuel. The primary oxidant may be air or any other oxidant. Preferably, at least one of said longitudinal burners 122 used to heat the or those heating zones 120 in which the present invention is applied (in the example shown in FIGS. 1 and 2 only zone 120) is or has been converted for high-oxygen oxidant supplementation, by a respective separate primary oxidant lance 124 (see FIG. 2) being installed at a distance from the respective burner 122 in question, such as at least 50 cm from the fuel inlet of the burner 122, fed with primary oxidant from control device 160 via line 165. The lanced primary oxidant, forming a jet 124a substantially in a downstream direction in the longitudinal direction D, may preferably be the only primary oxidant used, however it may also be used in addition to primary oxidant which is supplied via the burner 122 itself. The lanced primary oxidant is preferably supplied at large velocity, such at least at Mach 1. This provides very high thermal efficiency and low $NO_x$ formation, in particular in case the lanced primary oxidant comprises at least 85% by weight, or is even more preferably industrially pure oxygen.

It is preferred that each of the burners 122 so supplemented using a respective primary oxidant lance 124 is an existing burner 122, preferably an air burner, which is retrofitted by said lance 124, during which retrofitting some or all of the primary oxidant (hence, preferably in the form of air) is replaced by the described lanced primary oxidant.

As seen in FIG. 2, the burners 122 are directed so that their flames are directed somewhat downwards. However, the respective horizontal component of their respective flames is preferably substantially parallel with the longitudinal direction D.

The present invention solves problems when operating a furnace 100, in particular with such longitudinally fired burners with displaced fuel injection that are of the described high velocity, high oxygen primary oxidant lancing type, where primary oxidant is lanced at a distance from the burner 122 in question.

According to the invention, the burner 122 in question is operated with a mass relationship between the fed fuel and the primary oxidant, irrespectively of whether the primary oxidant is supplied through the burner 122 and/or via a separate lance 124, permitting less than 90%, preferably less than 50%, preferably around 25%, such as between 20% and 40%, of the fed fuel to be combusted using the primary oxidant. In other words, the combustion mixture provided via the burners 122 is sub-stoichiometric. Preferably, the furnace atmosphere in a sub zone A1 immediately downstream of the burners 122 is sub-stoichiometric, preferably so that at least 100% more oxygen than what is available therein would be required for stoichiometric combustion of the combustible fuel therein during operation of the furnace 100.

According to the invention, two pairs 151, 152; 153, 154 of secondary oxidant lances are provided, one pair on each lateral side of the furnace 100 and pointing into the heating zone 120 in question, in which heating zone 120 the above described existing burner 122 is arranged. The secondary oxidant lances are arranged to lance a secondary oxidant into the heating zone 120 at a location downstream of the burner 122, so that a respective secondary oxidant jet 155 is directed substantially in parallel with the cross plane C. It is preferred that the lanced secondary oxidant jets 155 are directed substantially perpendicularly to the burner's 122 flame, at least as seen in a projection onto the horizontal plane.

Preferably, the lances 151, 152, 153, 154 are arranged above the material 104 to be heated, in an upper zone, and are preferably arranged to provide their respective flames also above the material 104 to be heated.

Further according to the invention, the temperature of the furnace 100 atmosphere is measured along a horizontal line parallel to said cross plane C, downstream of the said lances 151, 152, 153, 154. In FIG. 2, three illustrative temperature sensors 168a, 168b, 168c are shown along such an imaginary line, each reporting respective measurement values to a control device 160. The sensors 168a, 168b, 168c are preferably symmetrically arranged along said horizontal line, and preferably comprise one sensor 168a, 168c on either lateral side of the heated zone 120, preferably arranged to measure the temperature at a lateral side edge of the heated material 104, and at least one sensor 168b arranged to measure the temperature there between, preferably in or near the lateral centre of the zone 120 along said horizontal line.

According to the invention, each of said lance pair 151, 152; 153, 154 comprises a first lance 152; 154 and a second lance 151; 153. Each respective second lance 151; 153 is arranged downstream, in other words along the longitudinal direction D but along the general flow direction of the furnace atmosphere gases in the zone 120, of the corresponding first lance 152; 154. Furthermore, the first lance 152; 154 in each lance pair is operated at a lower lancing speed than the second lance 151; 153 in each lance pair, and the amount of secondary oxidant supplied via the respective first lance 152; 154 of each pair is regulated, such as based upon measurement values from sensors 168a, 168b, 168c, so as to achieve a homogenous temperature profile along the said horizontal line.

In other words, the longitudinally fired burner 122 is operated sub-stoichiometrically, and additional, secondary oxidant is supplied via lances 151-154, which secondary oxidant is supplied from the lateral furnace sides, in a respective direction which is perpendicular to the general gas flow originating from the burner 122. The relatively low-velocity first lances 152, 154 are suitable for lateral temperature control, while the relatively high-velocity second lances 151, 153 provide both lateral temperature homogeneity and diffuse combustion. Such diffuse combustion provides low $NO_x$ formation. Hence, such a setup provides a possibility to precisely control the lateral temperature in the heating zone 120 while still operating the zone 120 at high efficiency and low $NO_x$ formation. In particular, this can be achieved using a standard-equipped heating zone 120 which can be retrofitted with lances 124, 151, 152, 153, 154, along with control device 160, at relatively low cost. Due to the high-velocity second lances 151; 153, the secondary oxidant injected via the first, more low-velocity, lances 152; 154 does not stick to the furnace side (because of the coanda effect), which leads to the risk of overheating the material 104 side edges decreasing even further.

Also, since the combustion is sub-stoichiometric close to the burner 122, where the material 104 is hotter, oxide formation on the material 104 surface is also decreased.

Furthermore, the material 104 will be heated from an earlier point in the furnace, without any additional separate burners being installed at such heating point. In practise, this has proved to be difficult to achieve with a simpler lancing solution, since this typically leads to non-homogenous temperature distributions.

The lances 151, 152, 153, 154 are preferably arranged in the furnace 100 side, as opposed to in its ceiling or floor.

According to a preferred embodiment, the longitudinal length of the heating zone 120 in which the present invention is applied is between 5 and 15 meters, and the lateral width of the heating zone 120 is preferably at least 4 meters, more preferably at least 8 meters. In such a heating zone 120, the advantages of the present invention are expressed most.

The secondary oxidant, as supplied via lances 151, 152, 153, 154, represents at least 50% by weight, preferably at least 65% by weight, more preferably at least 70% by weight of the total supplied primary and secondary oxidants. Furthermore, the secondary oxidant preferably comprises at least 85% by weight oxygen, and is even more preferably industrially pure oxygen. This provides very high combustion efficiency, while still achieving the other mentioned advantages of the present invention.

Still preferably, for each lance pair 151, 152; 153, 154, the respective second lance 151; 153 is operated at a lancing velocity which is at least 2 times, preferably at least 4 times, most preferably at least 8 times, the lancing velocity of the respective first lance 152; 154. Specifically, the respective second lance 151; 153 is preferably arranged to supply a lanced secondary oxidant jet with a velocity of at least Mach 1.0, more preferably at least Mach 1.2, still more preferably at least Mach 1.3, The first lances 152; 154 preferably provide a respective secondary oxidant jet with a velocity of at least 50 m/s.

According to a preferred embodiment, which is illustrated in FIG. 2, for each lance pair 151, 152; 153, 154, the first 152; 154 and second 151; 153 lances share one common secondary oxidant supply 166, which is arranged to supply secondary oxidant to control device 160 via a line 167. From the control device 160, respective lines 161, 162, 163, 164 forward the secondary oxidant to the lances 151, 152, 153, 154.

Preferably, a respective nozzle of each first lance 152; 154 orifice is larger than a corresponding second lance 151; 153 nozzle, so that secondary oxidant is supplied at lower pressure from first lances 152; 154 than from second lances 151; 153 in case the same pressure prevails in lines 161 and 162, and in lines 163 and 164, respectively. This may preferably be the case when no dynamically controllable or adjustable pressure regulation is applied regarding the lances 151, 152, 153, 154. For instance, first lances 152; 154 may have nozzles with an inner diameter of 28-30 mm, while second lances 151; 153 may have laval nozzles of about 16 mm inner diameter. In general, first lances 152; 154 nozzles may have inner diameters that are 50%-150% larger than inner diameters of second lance 151; 153 nozzles.

In particular, it is preferred that, for each lance pair 151, 152; 153, 154, the respective first lance 152; 154 nozzle orifice is selected so as to allow an amount of secondary oxidant to be supplied, using the common secondary oxidant supply 166 and via the first lance 152; 154 in question, when no dynamically controllable or adjustable regulation is applied regarding the first lance 152; 154 in question, so as to achieve a certain heating of a lateral side part of the heating zone 120, which side part is located in the vicinity of the orifice of the first lance 152; 154 in question when the burner 122 is active. Preferably, the said certain heating is at least so intense so that a predetermined maximum temperature, above which the material 104 is not to be heated in the furnace 100, is reached at the side edge of the material 104 during its passage through the heating zone 120, and preferably even more intense.

Then, a regulation, performed by control device 160 during heating operation and using suitable valve means or the like, of the secondary oxidant supplied to the respective first lance 152; 154 in each pair 151, 152; 153, 154 is operable to regulate down the amount of secondary oxidant supplied via the respective first lance 152; 154 in question, so as to reach an intensity which is low enough so as to avoid overheating of the material 104 side edge. This will be described in the following.

Preferably, in each lance pair 151, 152; 153, 154, the amount per time unit of secondary oxidant provided via the respective second lance 151; 153 is furthermore regulated so as to achieve a total desired amount of supplied oxygen into the heating zone 120, or at least in a sub zone A2 arranged downstream (left in FIGS. 1 and 2) of the said sub-stoichiometrically operated zone A1, preferably so as to achieve overall stoichiometry or at least substantially overall stoichiometry in the heating zone 120 or sub zone A2, also taking into consideration the sub-stoichiometric gases arriving from the upstream heating zone 130.

At the same time, it is preferred that, in each lance pair 151, 152; 153, 154, the regulation of the secondary oxidant provided via the respective first lance 152; 154 is performed independently, by the control device 160, of the presently supplied secondary oxidant via the respective second lance 151; 153. This means that the regulation of the respective first lance 152; 154 can result in the combustion mixture in the heating zone 120 temporarily becoming non-stoichiometric. Such non-stoichiometry will, however, over time be corrected as a result of the regulation of the second respective lance 151; 153. The corresponding is true in case a certain overall non-stoichiometric oxidant/fuel mass proportion is desired in the heating zone 120, in which case the regulation of the second lances 151; 153 is performed so as to achieve the mass proportion in question. The mass proportions may be measured directly, or indirectly by measuring supplied volumes of fuel and oxidants. Preferably, the total supplied oxidant is controlled based upon the total furnace 100 or heating zone 120 power, as measured using suitably arranged temperature sensors. One particularly simple way of regulating the secondary oxidant flow injected via the second lances 151, 153 is to let the lances 151, 152, 153, 154 be supplied from the same secondary oxidant source 166, and to allow the secondary oxidant not supplied via the first lances 152; 154 instead be supplied via the second lances 151;153, while keeping the total amount of supplied secondary oxidant constant.

Hence, the first lances 152; 154 are controlled, by the control device 160 and based upon readings from sensors 168a, 168b, 168c along the said horizontal line, with the aim of achieving a homogenous temperature profile along the said horizontal line. Since the first lances 152; 154 are arranged to primarily heat the lateral sides of the heating zone 110, and as a result the lateral sides of the material 104, and since the second lances 151; 153 heat the heating zone 110 more diffusely, not least the lateral central parts of the heating zone 110, this means that this control is performed by heating the relatively cooler lateral sides of the zone 110 to a temperature corresponding to the one measured in centrally located temperature sensors 168b along said line, by increasing the first lance 152; 154 supply of relatively low-velocity secondary oxidant in order to increase lateral side temperature.

In practise, the total amount of primary and secondary oxidant may be controlled by a quota regulator, based upon the amount of fuel required to reach a desired temperature value. The share of secondary oxidant may be determined by an operator. The relative amount of the secondary oxidant supplied using lances 152; 154 from each side of the furnace may be controlled to achieve an even temperature between the furnace sides, as read by sensors 168a, 168c. The relative share of the secondary oxidant exiting through the first, low-velocity lances 152; 154, as compared to the second, high-velocity lances 151; 153, may be controlled to achieve an even temperature between the sides and the centre, as measured by sensor 168b.

In a particularly simple yet useful embodiment, there are three sensors 168a-168c as showing in FIG. 2, one on either lateral side and one at the lateral centre of the furnace 100. Then, the temperature measured by the two laterally leftmost sensors 168a, 168b are used to control the laterally left first lance 152 using a respective valve in the control device 160, while the temperature measured by the two laterally rightmost sensors 168b, 168c are used to control the laterally right first lance 154 using a respective valve in the control device 160. Hence, three temperature sensors is sufficient to achieve the present purposes.

It is preferred that the horizontal line along which the temperature sensors 168a-168c are located is arranged downstream (left in FIGS. 1 and 2) of the second lances 151; 153, preferably at least 0.5 meters downstream thereof.

According to a preferred embodiment, the respective first lance 152; 154 in said lance pairs 151, 152; 153, 154 is arranged at a distance, in the longitudinal direction D, from the burner 122 which is at least 40%, preferably at least 50%, of the distance between the burner 122 and the longitudinal downstream (to the left in FIGS. 1 and 2) end of the zone 120. Correspondingly, it is preferred that the respective second lance 151; 153 in said lance pairs 151, 152; 153, 154 is arranged at a longitudinal distance from the burner 122 which is at the most 80%, preferably at the most 70%, of the distance between the burner 122 and the longitudinal downstream end of the zone 120. This geometry has proven to achieve good thermal results, both in terms of low thermal gradients and material 104 side edge temperature control.

In particular, it is preferred that, for each lance pair 151, 152; 153, 154, the respective first lance 152; 154 is arranged between 0.5 and 2 meters upstream (right in FIGS. 1 and 2) of the second lance 151; 153. Preferably, the first 152; 154 and second 151; 153 lances, respectively are arranged substantially at the same longitudinal D location along the furnace 100, substantially facing each other. Such a configuration is illustrated in FIG. 2.

According to a preferred embodiment, for each lance pair 151, 152; 153, 154, the secondary oxidant jet lanced from the respective second lance 151; 153 intersects a flame from the burner 122. This is particularly preferred in the case described above, in which the burner 122 has displaced fuel injection, in particular in case a high velocity primary oxidant lance 124 is used. Namely, in this case it is often a problem that the flame from the burner 122 extends across the whole heating zone 120, possibly even into a downstream (left in FIGS. 1 and 2) zone 110. The second lances 151;153, ejecting a respective high-speed secondary oxidant jet perpendicularly to the burner's 122 flame, solves this problem and guarantees that the thermal energy from combustion of the fuel and primary oxidant is primarily used to heat the material 104 in the zone 120.

It is furthermore preferred that, for each lance pair 151, 152; 153, 154, the lanced secondary oxidant is supplied above the burner 122 flame trajectory but pointing downwards at an angle of between 5° and 15°. This will create an efficient turbulence when the lanced secondary oxidant strikes the burner's 122 flame trajectory. At any rate, it is preferable that the lanced secondary oxidant is directed so that it never comes closer than about 0.5 m from the upper surface of the material 104.

Also, it is preferred that the lanced secondary oxidant from the respective second lances 151; 153 at least partially intersect one with the other. In general, it is preferred that the secondary oxidant lances 151, 152, 153, 154 give rise to respective secondary oxidant streams that at least partially intersect.

Herein, that two lanced jets of oxidant, or such a jet and a flame, "intersect" is intended to mean that at least a part of the two intersecting bodies overlap during operation of the furnace 100.

In a specifically preferred embodiment, the lanced secondary oxidant from the respective second lances 151; 153 cooperate so as to impart a rotating motion of the furnace 100 atmosphere in the heating zone 110. For instance, this can be achieved by said second lances 151; 153 being directed substantially towards each other but with a slight divergence, so that the jet from one of them is directed slightly upwards while the other is directed slightly downwards, or forwards/backwards.

Preferably, the burner 122 can be operated at least in a first mode, in which the burner 122 is operated at near stoichiometry, and a in a second mode, in which the burner 122 is operated sub-stoichiometrically. In the latter case, secondary oxidant supplied via the lances 151, 152, 153, 154 is used to achieve near stoichiometry as described above. However, in this case it is preferred that, in the first mode, between 1% and 5% of the total oxygen is still supplied in the form of secondary oxidant or air, via the lances 151, 152, 153, 154, for cooling the lances 151, 152, 153, 154. This way, a broad power spectrum can be achieved for the heating zone 110, while still not risking the integrity of the lances 151, 152, 153, 154 in said low-power operating mode.

Regarding the construction of the lances 151, 152, 153, 154 themselves, it is preferred that each of said lances 200 are arranged in a respective tube 210, through which tube 210 cooling air 220 is supplied, such as from a suitable source 221, in a way so that the cooling air 220 surrounds the respective lance 200 envelope surface 211. The secondary oxidant is supplied in a stream 212, concentrically within the cylindrical stream 220 of cooling air. This is illustrated, in cross-section, in FIG. 3.

FIG. 4 illustrates a method according to the present invention, using the furnace 100 and system described above, and controlled by the control device 160.

In a first step, the equipment required to perform the present method in a particular heating zone 120 is installed, preferably onto an existing furnace 100 installation. Hence, installed equipment comprises at least the above described oxidant lances 151, 152, 153, 154, the control device 160 and any peripheral equipment, such as the secondary oxidant source 166, lines 161, 162, 163, 164, 167, as well as sensors 168a, 168b, 168c unless such sensors have not already been installed. Preferably, this installation step also comprises converting at least one burner 122 in the heating zone 120 for displaced fuel injection as described above, such as by installing primary oxidant lance 124 and line 165.

Then, the burner 122 is initiated.

Thereafter, the heating zone 120 is preferably operated in one of at least two different modes, namely the above described conventional, stoichiometric mode in which substantially all oxidant is supplied as primary oxidant and only a small amount of secondary oxidant is used to cool the lances 151, 152, 153, 154; and a second mode, in which the burner 122 is operated sub-stoichiometrically and larger volumes of secondary oxidant is supplied via lances 151, 152, 153, 154 so as to achieve near stoichiometry in the sub zone A2.

In model, no regulation of the lances 151, 152, 153, 154 is performed based upon sensor 168a, 168b, 168c is done. While operating in mode 2, however, the temperature is measured along said horizontal line, and the first respective lances 152; 154 are regulated with the aim of homogenizing the temperature profile along the horizontal line. The second respective lances 151; 153 are then regulated with the aim of achieving stoichiometry, as described above. This regulation feedback loop is ongoing throughout the performance of the mode 2 operation.

According to a preferred embodiment, mode 2 also optionally comprises a pulsed operation of the respective lance pairs 151, 152; 153, 154. Thus, the proportion of the secondary oxidant supplied via each of the respective lance pairs 151, 152; 153, 154 is preferably varied over time, so that relatively more secondary oxidant is supplied via the two pairs 151, 152; 153, 154 in an alternating manner, with a period of between 10 seconds and 2 minutes. First, more secondary oxidant is supplied via pair 151, 152 than via pair 153, 154; thereafter, the situation is reversed, and so on. Preferably, only the second respective lance 151; 153 is varied over time so as to achieve such pulsing, while the first respective lance 152; 154 keeps on regulating so as to keep the temperature profile homogenous, but both first 152; 154 and second 151; 153 lances could also take part in this pulsing. Pulsed operation achieves even better temperature homogeneity in the heating zone 120, since the combustion intensity patterns shift laterally with the pulsing. The relative pulse times between the two opposite sides may also be controlled to be different, so as to further increase temperature homogeneity as measured by sensors 168a and 168c.

It is particularly preferred that, during said variation, the mass flow of secondary oxidant supplied via each of said lance pairs is varied between a lower mass flow of between 0 and 40% of the total instantaneous secondary oxidant mass flow and an upper mass flow of between 60% and 100% of the total instantaneous secondary oxidant mass flow, which total instantaneous oxidant mass flow is kept substantially constant during the said variation.

The furnace 100 is preferably a walking beam furnace, a pusher furnace or a rotary hearth furnace. The material 104 is preferably blanks, such as rounded or rectangular steel blanks.

Above, preferred embodiments have been described. However, it is apparent to the skilled person that many modifications can be made to the disclosed embodiments without departing from the basic idea of the invention.

For instance, more than two lances can be used in each lance pairs, and more than two lance pairs can be used. Also, there may be more air or converted burners in the heating zone.

Figure 3:
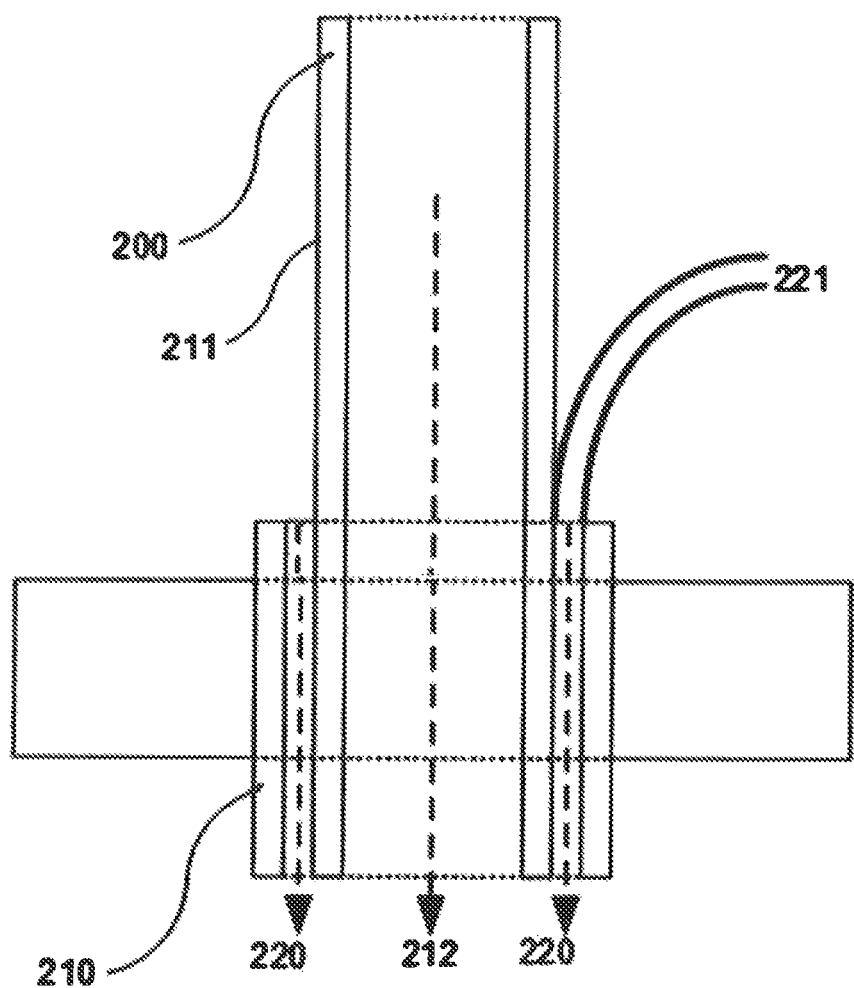
FIG. 3 is a simplified detail view of a secondary oxidant lance, in accordance with the present invention.

All which is described in relation to the method illustrated in FIG. 4 is applicable to the system described in relation to FIGS. 1-3, and vice versa.

Hence, the invention is not limited to the described embodiments, but can be varied within the scope of the enclosed claims.

What is claimed is:

1. A method for heating a furnace (100) having a longitudinal direction and a cross plane (C) perpendicular to the longitudinal direction, the furnace (100) having at least one heating zone (120) heated using at least one burner (122) providing a flame which extends in said longitudinal direction, the at least one burner (122) being fed with a fuel and a primary oxidant, the furnace further having a first side and a second side wherein said first and second sides are each parallel to said longitudinal direction, said method comprising:

operating the burner (122) with a mass relationship between the fed fuel and the primary oxidant permitting less than 90% of the fed fuel to be combusted using the primary oxidant;

providing at least two pairs of secondary oxidant lances (151,152;153,154) with one pair of the secondary oxidant lances on each of said first and second sides of the furnace (100) pointing into the heating zone (120);

lancing a secondary oxidant into the heating zone (120) downstream of the burner (122) via said at least two pairs of secondary oxidant lances, the lancing of said secondary oxidant being substantially parallel with the cross plane (C); and measuring a temperature along a horizontal line parallel to said cross plane downstream of the oxidant lances, wherein each pair of said secondary oxidant lances (151,152;153,154) comprises: a respective first lance (152;154) and a respective second lance (151;153), wherein the respective second lance (151,153) is positioned downstream of the respective first lance (152; 154), operating the respective first lance (152;154) of the secondary oxidant lances (151,152;153,154) at a lower lancing speed than the respective second lance (151; 153) of the secondary oxidant lances (151,152;153, 154), and regulating an amount of the secondary oxidant supplied via the respective first lance (152;154) of each pair of said secondary oxidant lances for achieving a homogenous temperature profile along the horizontal line.

2. The method of claim 1, wherein the heating zone (120) comprises a longitudinal length of from between 5 and 15 meters, and a width of at least 4 meters.

3. The method of claim 1, wherein the secondary oxidant comprises at least 50% to at least 70% by weight of a total amount of the primary and the secondary oxidants supplied.

4. The method of claim 1, wherein the secondary oxidant comprises at least 85% by weight oxygen.

5. The method of claim 1, further comprising operating the respective second lance (151;153) of each pair of said secondary oxidant lances at a lancing velocity which is from at least 2 times a lancing velocity of the respective first lance (152;154).

6. The method of claim 5, comprising operating the respective second lance (151;153) at the lancing velocity of at least Mach 1.

7. The method of claim 1, further comprising regulating in each pair of secondary oxidant lances (151,152;153,154) an amount per time unit of the secondary oxidant provided via the respective second lance (151;153) for achieving a total desired amount of supplied oxygen in the heating zone (120).

8. The method of claim 1, further comprising:

arranging the respective first lances (152;154) of each pair of said secondary oxidant lances at a longitudinal distance from the burner (122) of at least 40% of a distance between the burner (122) and a longitudinal downstream end of the heating zone (120); and arranging the respective second lances (151;153) at another longitudinal distance from the burner (122) of at most 80% of the distance between the burner (122) and the longitudinal downstream end of the heating zone (120).

9. The method of claim 1, further comprising, for each pair of said secondary oxidant lances, arranging the first lance (152;154) from between 0.5 meters and 2 meters upstream of the respective second lance (151;153).

10. The method of claim 1, further comprising intersecting a secondary oxidant jet lanced from each respective second lance (151;153) with a flame trajectory from the burner (122).

11. The method of claim 1, further comprising supplying a lanced secondary oxidant from each respective second lance (151;153) above a flame trajectory of the burner (122), and directing the lanced secondary oxidant downwards at an angle of from between 5° and 15°.

12. The method of claim 1, wherein lanced secondary oxidant from the respective second lances (151;153) imparts a rotating motion to an atmosphere of the furnace in the heating zone (120).

13. The method of claim 1, further comprising varying over time that proportion of the secondary oxidant supplied via each pair of the secondary oxidant lances (151,152;153, 154) such that more of the secondary oxidant is supplied via the at least two pairs of secondary oxidant lances (151,152; 153,154) in an alternating manner during a period of from between 10 seconds and 2 minutes.

14. The method of claim 13, wherein the varying comprises varying a mass flow of the secondary oxidant supplied via each of said lance pairs (151,152;153,154) between a lower mass flow of from between 0 and 40% of a total instantaneous secondary oxidant mass flow and an upper mass flow of from between 60% and 100% of the total instantaneous secondary oxidant mass flow, and keeping a total instantaneous oxidant mass flow substantially constant during the said varying.

15. The method of claim 1, wherein the heating zone (120) comprises a longitudinal length of from between 5 and 15 meters, and a width of at least 8 meters.

16. The method of claim 1, further comprising operating the respective second lance (151;153) of each pair of said secondary oxidant lances at a lancing velocity which is from at least 8 times a lancing velocity of the respective first lance (152;154).

* * * * *